United States Patent [19]

Kudo et al.

[11] Patent Number: 4,634,585

[45] Date of Patent: Jan. 6, 1987

[54] HETEROPOLY ACID CONTAINING CARBON AS HETERO ATOM

[75] Inventors: Tetsuichi Kudo, Setagaya; Go Kawamura, Musashino; Akira Ishikawa, Kokubunji, all of Japan

[73] Assignee: Hitachi, Ltd., Tokyo, Japan

[21] Appl. No.: 737,474

[22] Filed: May 24, 1985

[30] Foreign Application Priority Data

May 25, 1984 [JP] Japan ................... 59-104553

[51] Int. Cl.$^4$ ............................................. C01B 31/24
[52] U.S. Cl. ................................. 423/419 R; 423/55; 423/606; 350/357
[58] Field of Search ............... 423/419 R, 606, 415 R, 423/439, 55; 502/174, 182; 260/429 R; 556/58, 59; 350/357

[56] References Cited

U.S. PATENT DOCUMENTS

| | | | |
|---|---|---|---|
| 3,446,574 | 5/1969 | Head ................................. | 423/419 |
| 3,755,146 | 8/1973 | Harris et al. ..................... | 423/606 |
| 3,890,243 | 6/1975 | Gandon et al. .................. | 423/419 |
| 3,941,707 | 3/1976 | Weis ................................. | 423/606 |
| 4,083,922 | 4/1978 | Kasserra ........................... | 423/606 |
| 4,271,041 | 6/1981 | Boudart et al. ................. | 423/415 R |
| 4,339,424 | 7/1982 | Jacobson et al. ................ | 423/606 |
| 4,521,081 | 6/1985 | Miyake et al. .................. | 350/357 |
| 4,522,934 | 6/1985 | Shum et al. ..................... | 502/210 |
| 4,527,865 | 7/1985 | Washo et al. ................... | 350/357 |
| 4,529,274 | 7/1985 | Iwata ................................ | 350/357 |
| 4,533,527 | 8/1985 | Farrell et al. ................... | 423/53 |

OTHER PUBLICATIONS

Hack's Chemical Dictionary, p. 321.

*Primary Examiner*—Andrew H. Metz
*Assistant Examiner*—Anthony McFarlane
*Attorney, Agent, or Firm*—Antonelli, Terry & Wands

[57] ABSTRACT

The present invention relates to a heteropoly acid containing carbon as a hetero atom. This heteropoly acid is useful as catalysts or starting materials for various reactions, color forming material or counter electrode material for electrochromic display element or the like.

4 Claims, No Drawings

HETEROPOLY ACID CONTAINING CARBON AS HETERO ATOM

BACKGROUND OF THE INVENTION

The present invention relates to a heteropoly acid. The heteropoly acids shown in the following Tables 1 and 2 (See "Kagaku no Ryoiki", 29, 12, P.853 (1975)) are well known. However, no compounds containing carbon as hetero atom have been known as yet.

TABLE 1

Elements (X) which constitute heteromolybdic acids and their formulae

| Ratio of the element to Mo | Hetero atom | Formula of heteropoly acid |
|---|---|---|
| 1:12 | Series A: $N^{5+}(?)$, $P^{5+}$, $As^{5+}$, $Si^{4+}$, $Ge^{4+}$, $Sn^{4+}(?)$, $Ti^{4+}$, $Zr^{4+}$ | $[X^{n+}Mo_{12}O_{40}]^{-(8-n)}$ |
|  | Series B: $Ce^{4+}$, $Th^{4+}$, $Sn^{4+}(?)$ | $[X^{n+}Mo_{12}O_{42}]^{-(12-n)}$ |
| 4:12 | $As^{5+}$ | $[H_4As_4Mo_{12}O_{52}]^{-4}$ |
| 1:11 | $P^{5+}$, $As^{5+}$, $Ge^{4+}$ | $[X^{n+}Mo_{11}O_{39}]^{-(12-n)}$ |
| 2:5 | $S^{4+}$, $P^{5+}$ | $[X_2Mo_5O_{23}]^{-6}$ |
| 1:10 | $P^{5+}$, $As^{5+}$, $Pt^{4+}(?)$ | $[X^{n+}Mo_{10}O_x]^{-(2x-60-n)}$ |
| 1:9 | $Mn^{4+}$, $Ni^{4+}$ | $[X^{n+}Mo_9O_{32}]^{-(10-n)}$ |
| 1:6 | Series A: $Te^{6+}$, $I^{7+}$ | $[X^{n+}Mo_6O_{24}]^{-(12-n)}$ |
|  | Series B: $Co^{3+}$, $Al^{3+}$, $Cr^{3+}$, $Fe^{3+}$, $Rh^{3+}$, $Ga^{3+}$, $Ni^{2+}$ | $[X^{n+}Mo_6O_{24}H_6]^{-(6-n)}$ |
| 2:13 | $P^{5+}$, $As^{5+}$ | $[X_2^{n+}Mo_{18}O_{62}]^{-(16-2n)}$ |
| 2:17 | $P^{5+}$, $As^{5+}$ | $[X_2^{n+}Mo_{17}O_x]^{-(2x-102-2n)}$ |
| 1 m:6 m | $Co^{2+}$, $Mn^{2+}$, $Cu^{2+}$, $Se^{4+}$, $P^{3+}$, $As^{3+}$, $P^{5+}$ | $[X^{n+}Mo_6O_x]_m^{-m(2x-36-n)}$ |

TABLE 2

Elements (X) constituting heteropoly acids together with tungsten and their formulae

| Ratio of the element to W | Hetero atom | Formula of heteropoly acid |
|---|---|---|
| 1:12 | $P^{5+}$, $As^{5+}$, $Si^{4+}$, $Ti^{4+}$, $Co^{3+}$, $Fe^{3+}$, $Al^{3+}$, $Cr^{3+}$, $Te^{4+}$, $B^{3+}$ | $[X^{n+}W_{12}O_{40}]^{-(8-n)}$ |
| 1:11 | $Si^{4+}$, $Pt^{4+}$ | $[X^{n+}W_{11}O_x]^{-(2x-66-n)}$ |
| 1:9 | $Be^{2+}$ | $[X^{2+}W_9O_{31}]^{-6}$ |
| 1:6 | Series A: $Te^{6+}$, $I^{7+}$ | $[X^{n+}W_6O_{24}]^{-(12-n)}$ |
|  | Series B: $Ni^{2+}$, $Ga^{3+}$ | $[X^{n+}W_6O_{24}H_6]^{-(6-n)}$ |
| 2:18 | $P^{5+}$, $As^{5+}$ | $[X_2^{n+}W_{18}O_{62}]^{-(12-n)}$ |
| 2:17 | $P^{5+}$, $As^{5+}$ | $[X_2^{n+}W_{17}O_x]^{-(2x-102-2n)}$ |
| 1 m:6 m | $As^{3+}$, $P^{3+}$ | $[X^{n+}W_6O_x]_m^{-m(2x-38-n)}$ |

SUMMARY OF THE INVENTION

An object of the present invention is to provide a novel heteropoly acid, and more particularly, to provide a heteropoly acid suitable as catalysts for various reactions or color forming material for electrochromic display element.

These objects can be attained with a heteropoly acid containing carbon as hetero atom.

DETAILED DESCRIPTION OF PREFERRED EMBODIMENTS

Tungsten carbide is dissolved in a solution of hydrogen peroxide to obtain a solution of dodecatungstocarbonate ion $[CW_{12}O_{40}]^{4-}$. This solution is evaporated to dryness to obtain dodecatungstocarbonic acid hydrate $H_4[CW_{12}O_{40}]\cdot nH_2O$ (where n is 2 to 30). Metallic tungsten or other tungsten compounds can not give this product. Similarly, $Mo_2C$ is dissolved in $H_2O_2$ to obtain a carbon-containing heteropoly acid. A heteropoly acid having an atomic ratio of carbon to W (or Mo) of 1:6 as well as one having the ratio of 1:12 can be prepared in this manner.

Now, the present invention will be illustrated by example.

8 g of tungsten carbide (WC) was placed in a beaker. 50 ml of a 15% aqueous solution of hydrogen peroxide ($H_2O_2$) was added to the beaker. The hydrogen peroxide ($H_2O_2$) was decomposed on the surface of the WC to generate oxygen ($O_2$), while the dissolution of the WC occurred. When the generation of oxygen become gentle, 10 ml of an aqueous solution of $H_2O_2$ was additionally added several times to dissolve the WC completely, thus obtaining a strongly acidic, colorless solution.

This solution as evaporated to dryness to obtain a solid state heteropoly acid (hereinafter referred to as "SHPA"). As the result of elemental analysis, the atomic ratio of carbon to tungsten of the SHPA was found to be 1:12. The SHPA was decomposed by thermal analysis in two stages. The dehydration occurred in the first stage to give $CO_2\cdot 12WO_3\cdot 4H_2O$ or $H_4CW_{12}O_{40}\cdot 2H_2O$ as an intermediate. The intermediate began to be decomposed remarkably from 280° C., thus giving $H_2O$, $CO_2$ and $WO_3$. The IR spectrum of the SHPA exhibited an absorption at 1730 cm$^{-1}$ due to $H(H_2O)n^+$. The above results and the results of IR and Raman spectral analyses proved the presence of $CW_{12}O_{40}^{4-}$ ion and a novel compound, $H_4CW_{12}O_{40}\cdot nH_2O$ (where n is 2 to 30).

The Raman spectrum with respect to the solution was 960, 880, 700 and 560 cm$^{-1}$, while the one with respect to the solid obtained by evaporation to dryness was 970, 890 and 560 cm$^{-1}$.

The above compound of the present invention can be used in the following fields.

(1) A NESA glass was spin-coated with a solution of SHPA and the resulting film was subjected to dry combustion at 110° C. When a voltage of 1.5 V was applied to reduce the film, the film was colored blue. Thus it was confirmed that the film has an electrochromic function.

(2) A solution of WC in $H_2O_2$ was mixed with a solution of $Mo_2C$ in $H_2O_2$ to give an atomic ratio of W to Mo of 7:3. The mixture was evaporated to dryness at 100° C. and placed in CO current of 800° C. to obtain a carbide $(W_{0.7}Mo_{0.3})C$. 0.5 ml of Teflon dispersion was added to 1 g of this carbide to obtain a paste. A wire made of Au was coated with this paste. The coated wire was subjected to heat-treatment at 300° C. to obtain an electrode for methanol fuel cell of acid electrolytic solution type. The characteristics of this electrode were superior to those of the electrode which was prepared by subjecting a powder obtained by carbonizing oxides with CO to the same treatment as the one described above. The active electrical current per g of (W, Mo) C was enhanced by about three times.

Now, the following example will illustrate the case where the compound of the present invention is used as an electrochromic display element.

1 g of SHPA was dissolved in 1 ml of water to obtain an aqueous solution. While rotating a glass substrate covered with a film of electrically conductive oxide (ITO) at a high speed, the aqueous solution was dropped on the ITO film to form an SHPA film of a thickness of 0.5 μm by spin-coating. The SHPA was partially dehydrated by heating the resulting film-covered glass substrate at 130° C. The resulting glass substrate having a film of SHPA and a carbon electrode were immersed in an organic electrolyte obtained by dissolving LiClO$_4$ in propylene carbonate, followed by connecting the ITO of the glass substrate and the carbon electrode with a direct current electric source. When a voltage of −1.5 V was applied to the ITO, the Li+ ion contained in the electrolyte was implanted into the SHPA, thus coloring the film blue. When a voltage of +1.5 V was applied to the blue film, the implanted Li+ ion was released into the electrolyte, thus making the film colorless. The response speed (time required for coloring) was nearly equivalent to that of the one prepared by deposition of WO$_3$ according to the prior art. Since, however, the SHPA film can be formed by spin-coating, the cost for preparing the film is very low, thus giving an economical advantage.

What is claimed is:

1. A heteropoly acid containing carbon as a hetero atom, wherein the heteropoly acid comprises dodecatungstocarbonate as represented by the general formula:

$$H_4[CW_{12}O_{40}] \cdot nH_2O$$

wherein n is 2 to 30.

2. A heteropoly acid as set forth in claim 1, wherein n in the general formula is 2.

3. A compound represented by the general formula:

$$H_4[CW_{12}O_{40}] \cdot nH_2O$$

wherein n is 2 to 30.

4. A compound as set forth in claim 3, wherein n is 2.